US012687119B2

(12) United States Patent
Alstad

(10) Patent No.: US 12,687,119 B2
(45) Date of Patent: Jul. 21, 2026

(54) TRANSFER TUBE SYSTEM ROUTING THROUGH LIMITED SPACE FOR GAS TURBINE ENGINE BLEED SYSTEM

(71) Applicant: HONEYWELL INTERNATIONAL INC., Charlotte, NC (US)

(72) Inventor: Shawn Alstad, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 12 days.

(21) Appl. No.: 18/944,299

(22) Filed: Nov. 12, 2024

(65) Prior Publication Data

US 2026/0132721 A1 May 14, 2026

(51) Int. Cl.
| | |
|---|---|
| *F02C 6/08* | (2006.01) |
| *F01D 17/10* | (2006.01) |
| *F01D 25/00* | (2006.01) |
| *F02C 7/00* | (2006.01) |
| *F02C 9/18* | (2006.01) |
| *F16L 27/10* | (2006.01) |

(52) U.S. Cl.
CPC ............. *F01D 17/10* (2013.01); *F01D 25/00* (2013.01); *F02C 6/08* (2013.01); *F02C 7/00* (2013.01); *F02C 9/18* (2013.01); *F16L 27/10* (2013.01); *F05D 2220/30* (2013.01); *F05D 2220/32* (2013.01); *F05D 2260/60* (2013.01)

(58) Field of Classification Search
CPC ................ F02C 9/18; F02C 6/08; F16L 27/10
See application file for complete search history.

(56) References Cited

U.S. PATENT DOCUMENTS

| | | | |
|---|---|---|---|
| 5,782,077 A | 7/1998 | Porte | |
| 6,684,909 B2 * | 2/2004 | Ijima | B29C 53/083 |
| | | | 138/121 |
| 6,685,425 B2 | 2/2004 | Poccia et al. | |
| 2007/0130912 A1 * | 6/2007 | Kraft | F28F 27/02 |
| | | | 60/785 |
| 2012/0318371 A1 | 12/2012 | Rynders, Jr. et al. | |
| 2013/0028718 A1 | 1/2013 | Strom et al. | |
| 2018/0209569 A1 * | 7/2018 | Tajiri | B64D 33/00 |
| 2018/0273186 A1 * | 9/2018 | Peacos, III | F02C 9/18 |

(Continued)

FOREIGN PATENT DOCUMENTS

| | | |
|---|---|---|
| CN | 201137785 Y | 10/2008 |
| FR | 3012846 A1 | 5/2015 |

*Primary Examiner* — Phutthiwat Wongwian
*Assistant Examiner* — Jacek Lisowski
(74) *Attorney, Agent, or Firm* — Ingrassia Fisher & Lorenz LLP

(57) ABSTRACT

A transfer tube system for connecting between a compressor and a bleed unit of a turbomachine includes a valve assembly with at least one inlet. The valve assembly is disposed to control bleed air flow from the compressor through a bleed system. A strut envelopes an interior space and extends between the compressor and the valve assembly. A bleed tube conduit is connected between the port/compressor and the inlet/valve assembly to convey gas between the compressor and the valve assembly. The conduit passes through the interior space of the strut and includes a pair of bellows disposed in the interior space. Between the bellows, the conduit has a central section with a non-circular shaped cross section to enable minimizing the width of the strut.

20 Claims, 6 Drawing Sheets

(56)      References Cited

U.S. PATENT DOCUMENTS

| | | | | |
|---|---|---|---|---|
| 2018/0320801 | A1* | 11/2018 | Yang | F16L 27/111 |
| 2019/0128453 | A1 | 5/2019 | Clark et al. | |
| 2019/0360404 | A1 | 11/2019 | Staudte | |
| 2020/0025005 | A1* | 1/2020 | Dunnigan | F01D 9/06 |
| 2020/0095883 | A1* | 3/2020 | Kray | F02C 6/08 |
| 2020/0149470 | A1* | 5/2020 | Evans | F04D 29/644 |
| 2021/0332764 | A1* | 10/2021 | Saripella | F02C 6/08 |
| 2023/0286668 | A1* | 9/2023 | Bordignon | B32B 7/027 |

* cited by examiner

TRANSFER TUBE SYSTEM ROUTING THROUGH LIMITED SPACE FOR GAS TURBINE ENGINE BLEED SYSTEM

TECHNICAL FIELD

The present disclosure generally relates to transferring pressurized gas from a compressor and through a restricted space for rotating machinery including turbomachinery, and more particularly relates to a bleed system's transfer tube system with features for routing in limited space applications such as with a gas turbine engine.

BACKGROUND

In the field of rotating machinery, gas flow may be generated by various components such as fans and compressors. In the case of a gas turbine engine, generated air may be routed from the engine and used as a pressurized gas source for any number of uses. When a gas turbine engine is employed on an aircraft, pressurized air may be routed out of, and away from, the engine. This bleed air is conveyed to the airframe and cabin of the aircraft where it is distributed and available for various uses such as cooling, cross starting another engine, deicing, cabin pressurization, driving motors/actuators, fluid tank pressurization, environmental control systems, and others.

The compressed air is generated in the gas turbine engine, often at locations that are separated from the aircraft cabin by obstacles such as cases, ducts, nacelles and spaces/gaps. Accordingly, some form of conduit system is required to transfer the compressed air from its source to its destination(s). A part of this conduit system may be referred to as bleed tubes which receive the compressed air at location points upstream from the engine's combustor. The path from these location points to the aircraft structure may be complex and may have little available space for routing the bleed tubes. The preferred path options may require taking an indirect or tortuous path rather than a simple straight line path. Providing a bleed system, and more generally a transfer tube system in applications where space is limited is challenging.

Accordingly, it is desirable to provide a system for conveying a compressed gas through a complex path with limited space while doing so in an effective and efficient manner. Furthermore, other desirable features and characteristics of the present disclosure will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In a number of embodiments, a transfer tube system is provided for connecting between a compressor and a bleed unit of a turbomachine. A bleed system includes a valve assembly with at least one inlet. The valve assembly is disposed to control bleed air flow from the compressor through the bleed system. A strut envelopes an interior space and extends between the compressor and the valve assembly. A bleed tube conduit is connected between the port of the compressor and the inlet of the valve assembly to convey gas between the compressor and the valve assembly. The conduit passes through the interior space of the strut and includes a pair of bellows disposed in the interior space. Between the bellows, the conduit has a central section with a non-circular shaped cross section to enable minimizing the width of the strut.

In additional embodiments, a transfer tube system for connecting between a compressor and a bleed unit of a turbomachine includes a valve assembly with a first inlet and a second inlet. The valve assembly is disposed to control gas flow from the compressor through a bleed system. A pair of ports are in fluid communication with the compressor. A strut has an interior space and extends between the compressor and the valve assembly. A pair of conduits are each configured as bleed tubes and are connected between the ports and the inlets. The conduits convey gas flow between the compressor and the valve assembly. The conduits extend through the interior space of the strut. Each conduit includes a pair of bellows disposed in the interior space. Each conduit has a central section between the bellows of its respective pair of bellows. Each central section has a non-circular shaped cross section.

In other embodiments, a transfer tube system for connecting between a compressor and a bleed unit of a turbomachine includes a valve assembly configured as a bleed unit. The valve assembly has a pair of inlets and is disposed to control bleed air flow from the compressor through a bleed system. A pair of ports are in fluid communication with the compressor and are disposed to receive gas at different pressure levels from the compressor. A strut has an interior space and extends between the compressor and the valve assembly and through a bypass duct of the turbomachine. A pair of conduits are configured as bleed tubes and are connected between the ports and the inlets to convey flows of bleed air between the compressor and the valve assembly. Both conduits extend through the interior space of the strut. Each conduit includes a pair of bellows disposed in the interior space. Between the individual bellows of each pair of bellows, the conduits each have a central section with a non-circular shaped cross section. Each conduit has a spine comprising a smooth curve connecting an inlet vector at the corresponding port for the conduit with an exit vector at the corresponding inlet for the conduit. The spine is substantially S-shaped.

BRIEF DESCRIPTION OF DRAWINGS

The present disclosure will hereinafter be described in conjunction with the following drawing figures, wherein like numerals denote like elements, and wherein.

DETAILED DESCRIPTION

Figure 1:
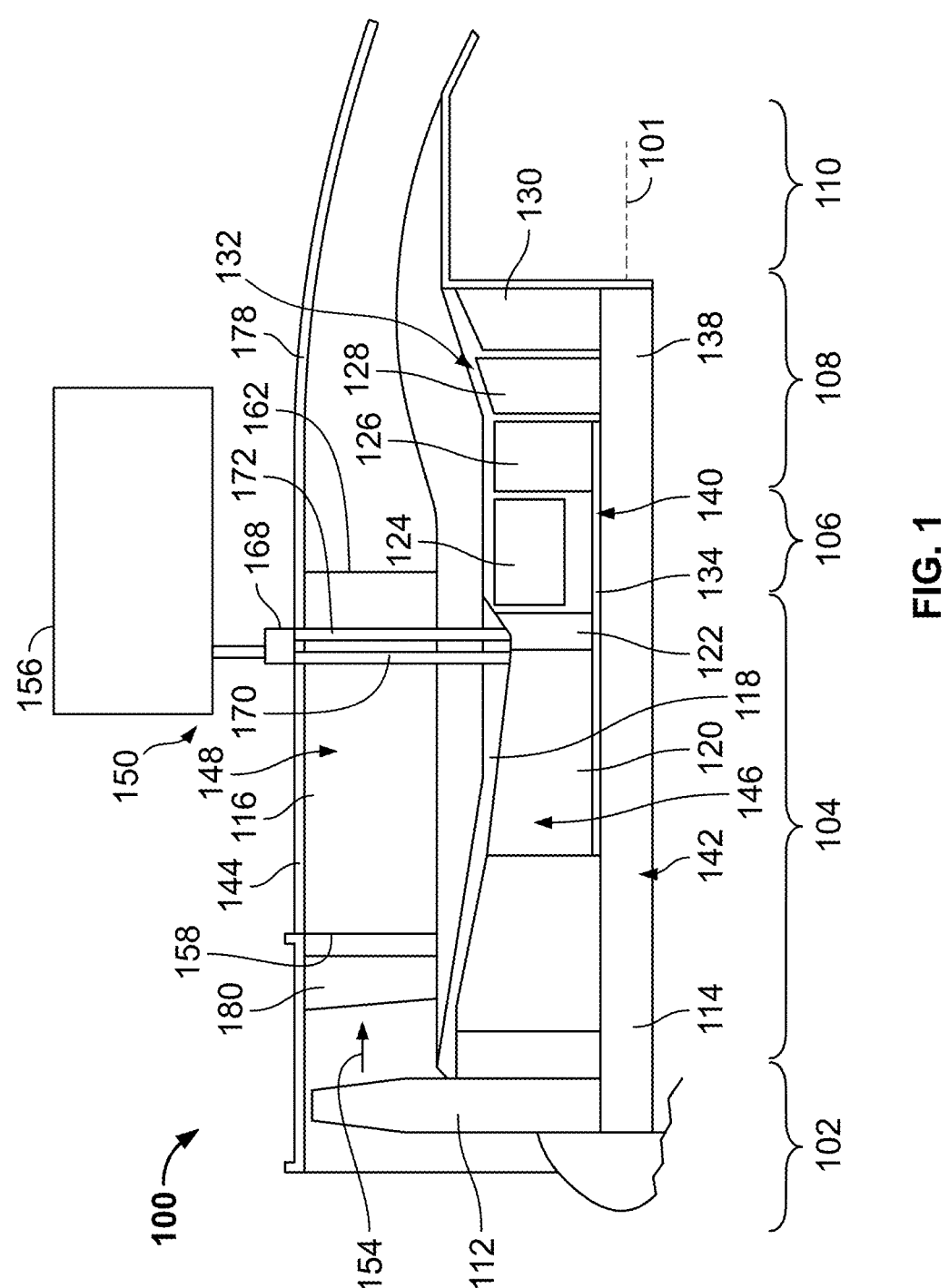
FIG. 1 is a schematic cross-sectional illustration of half of a gas turbine engine, which includes an exemplary transfer tube system, in accordance with a number of embodiments.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of arrangement that would benefit from a spring biased retention system and the use of the spring biased retention system for coupling a shroud to a case associated with a gas turbine engine described herein is merely one exemplary embodiment according to the present disclosure. In addition, while the spring biased retention system is described herein as being used with a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "about" denotes within 10% to account for manufacturing tolerances. In addition, the term "substantially" denotes within 10% to account for manufacturing tolerances.

With reference to FIG. 1, a partial (upper half as viewed), schematic, cross-sectional view of an exemplary gas turbine engine 100 is shown with the remaining portion of the gas turbine engine 100 being substantially axisymmetric about a longitudinal axis 101. The longitudinal axis 101 comprises an axis of rotation for the rotors of the gas turbine engine 100. In the depicted embodiment, the gas turbine engine 100 is an annular multi-spool, turbofan gas turbine jet engine for use with an aircraft (not shown), although other arrangements and uses in other turbomachinery are included within the scope of this disclosure. As will be discussed further herein, this disclosure includes a transfer tube system that includes two tubes routed from a pressure source, such as of the gas turbine engine 100. The disclosure is not limited to a gas turbine engine but may be applicable to other applications where routing gas from and/or to rotating machinery is desirable, including through limited spaces and/or where relative movements between connecting points are encountered.

In the example of FIG. 1, the application's rotating machinery is the gas turbine engine 100, which is configured as a two-spool engine. It will be appreciated that in other embodiments, a different number of spools with different compressor/turbine arrangements may be employed. The gas turbine engine 100 includes a fan section 102, a compressor section 104, a combustor section 106, a turbine section 108, and an exhaust section 110. The fan section 102 includes a fan 112 mounted on a rotor 114. The fan 112 draws air into the gas turbine engine 100 and accelerates it. A fraction of the accelerated air exiting from the fan 112 is directed through an outer bypass duct 116 and the remaining fraction of air exiting from the fan 112 is directed toward the compressor section 104. The outer bypass duct 116 is generally defined between an inner bypass duct 118 and an outer casing 144. The non-bypass air is directed into the core 146 of the gas turbine engine 100.

The gas turbine engine 100 in the embodiment of FIG. 1 includes a high pressure spool 140 that includes a high-pressure turbine 132, an axial compressor 120, a centrifugal compressor 122, and a shaft 134, which ties the components together in an assembly. As such, the high pressure turbine 132 drives the axial compressor 120 and the centrifugal compressor 122. In other embodiments, the number of compressors and the type of compressors in the compressor section 104 may vary. In the depicted embodiment the axial compressor 120 and the centrifugal compressor 122 sequentially raise the pressure of the air and direct a majority of the high-pressure air into the combustor section 106. As air moves through the compressor section 104 pressure levels increase along the path. A fraction of the compressed air bypasses the combustor section 106 and may be used to cool, among other components, blades 126, 128 in the turbine section 108. In this embodiment of the gas turbine engine 100, the high pressure turbine 132 includes at least two stages (upstream stage 164 and downstream stage 166) with two sets of blades 126 and 128 arranged in axial series. The blades 126 may have a different diameter at their tips as compared to the blades 128.

A low pressure spool 142 includes a low pressure turbine 130, the fan 112 and a shaft 138. The low pressure turbine 130 may include any number of axial stages appropriate for the application. The shaft 134 is a hollow shaft or shaft-like structure (at least in-part a hollow cylinder or cylindrical shaft), and the shaft 138 extends through the shaft 134. In other embodiments, other components may be coupled in the low pressure spool 142. In additional embodiments, a different arrangement may be employed. For example, the compressor section 104 may include a low pressure compressor and a high pressure compressor. In such an embodiment, the high pressure spool 140 may include the high pressure compressor and the low pressure spool may include the low pressure compressor. In still other embodiments, the shaft 134 may be assembled with other rotating components, such as in a pump or other rotating machinery type pieces of equipment with a different number of spools.

In the combustor section 106, which includes a combustion chamber 124, the high-pressure air is mixed with fuel, which is combusted. The high-temperature combustion air is directed into the turbine section 108. In this example, the turbine section 108 includes the two turbines disposed in axial flow series, namely, the high-pressure turbine 132, and a low-pressure turbine 130. However, it will be appreciated that the number of turbines, and/or the configurations thereof, may vary by application. In this embodiment, the high-temperature air from the combustor section 106 expands through and rotates each turbine 132 and 130. As the turbines 132 and 130 rotate, each drives equipment in the gas turbine engine 100 via the concentrically disposed shafts in their respective spools 140, 142.

The air flow 154 downstream from the fan 112 and passing through the outer bypass duct 116, encounters obstructions such as fan stator vanes, struts and other components. One such obstruction around which the air must pass is a strut 148, which in this example is at the twelve o'clock position of the gas turbine engine 100. The strut 148 may be referred to as a service strut 148 because components that communicate between the gas turbine engine 100 to the airframe 156 of an associated aircraft pass through the service strut 148. The service strut 148 extends longitudinally (the axial direction) in the outer bypass duct 116 from a leading end 158 to a trailing end 162. It has been found that the width of the service strut 148 has an effect on the noise and vibration generated during operation of the gas turbine engine 100. For example, a wider service strut 148 creates an increased chance of encountering harmonics/resonances leading to increased noise/vibration. Accordingly, it is desirable to minimize the width of the service strut 148.

Figure 2:
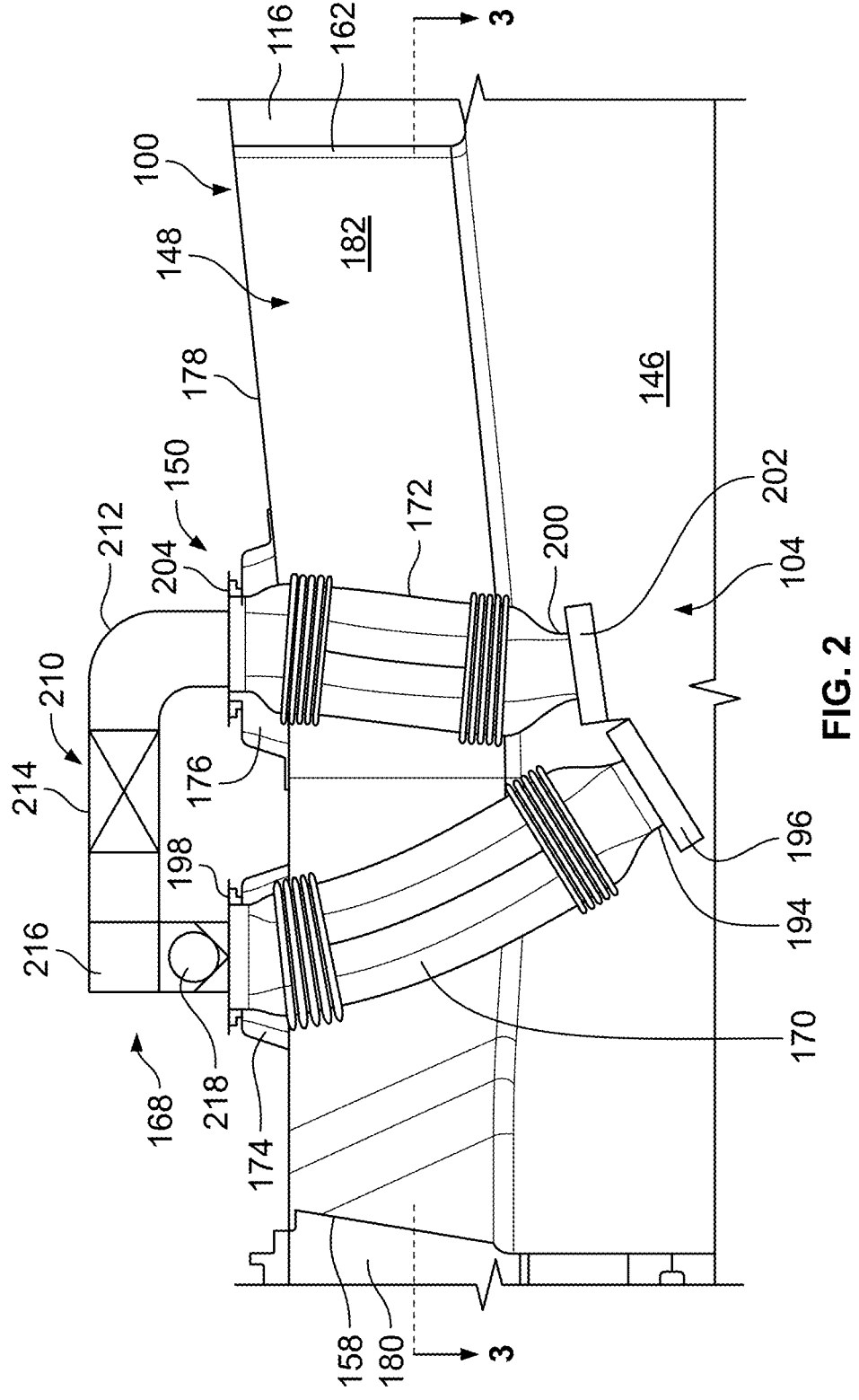
FIG. 2 is a fragmentary, schematic view of a part of the gas turbine engine of FIG. 1 showing aspects of a bleed system, in accordance with a number of embodiments.

Along with FIG. 1, reference is directed to FIG. 2 where a part of the gas turbine engine 100 around a bleed system, and a valve assembly thereof referred to as a bleed unit 168, is illustrated. Details of the core 146 are omitted in FIG. 2 for simplicity. In this example, the bleed system 150 includes a transfer tube conduit that is also referred to herein as a low pressure bleed tube 170. The low pressure bleed tube 170 is connected with the core 146 of the gas turbine engine 100 at the compressor section 104. In addition, a high pressure bleed tube 172 is another conduit connected with the core 146 of the gas turbine engine 100 at the compressor section 104.

The reference to high and low pressure means that, during operation of the gas turbine engine 100, the pressure available to and in the high pressure bleed tube 172 is higher than the pressure available to and in the low pressure bleed tube 170. This is because the low pressure bleed tube 170 is connected at a point of the compressor section 104 upstream from where the high pressure bleed tube 172 is connected. In some embodiments, the low pressure bleed tube 170 may be connected to be supplied with air compressed by a low pressure compressor and the high pressure bleed tube 172 may be supplied with air compressed by a high pressure compressor. In embodiments such as that of FIG. 1, the low pressure bleed tube 170 may be connected to be supplied with air compressed by the axial compressor 120 and the high pressure bleed tube 172 may be supplied with air compressed further by the centrifugal compressor 122.

Both the low pressure bleed tube 170 and the high pressure bleed tube 172 extend through the outer bypass duct 116 to respective bleed pads 174 and 176 located on the outer wall 178 of the outer bypass duct 116. The bleed pads 174, 176 may also be referred to as bleed bosses since they are formed as radially outward projecting parts of the outer wall 178. The low pressure bleed tube 170 and the high pressure bleed tube 172 also both pass through the service strut 148. The foreground wall of the service strut 148 is omitted in FIG. 2 for visibility and the side wall 182 in the background is shown extending from the leading end 158 to the trailing end 162.

Figures 3, 4:
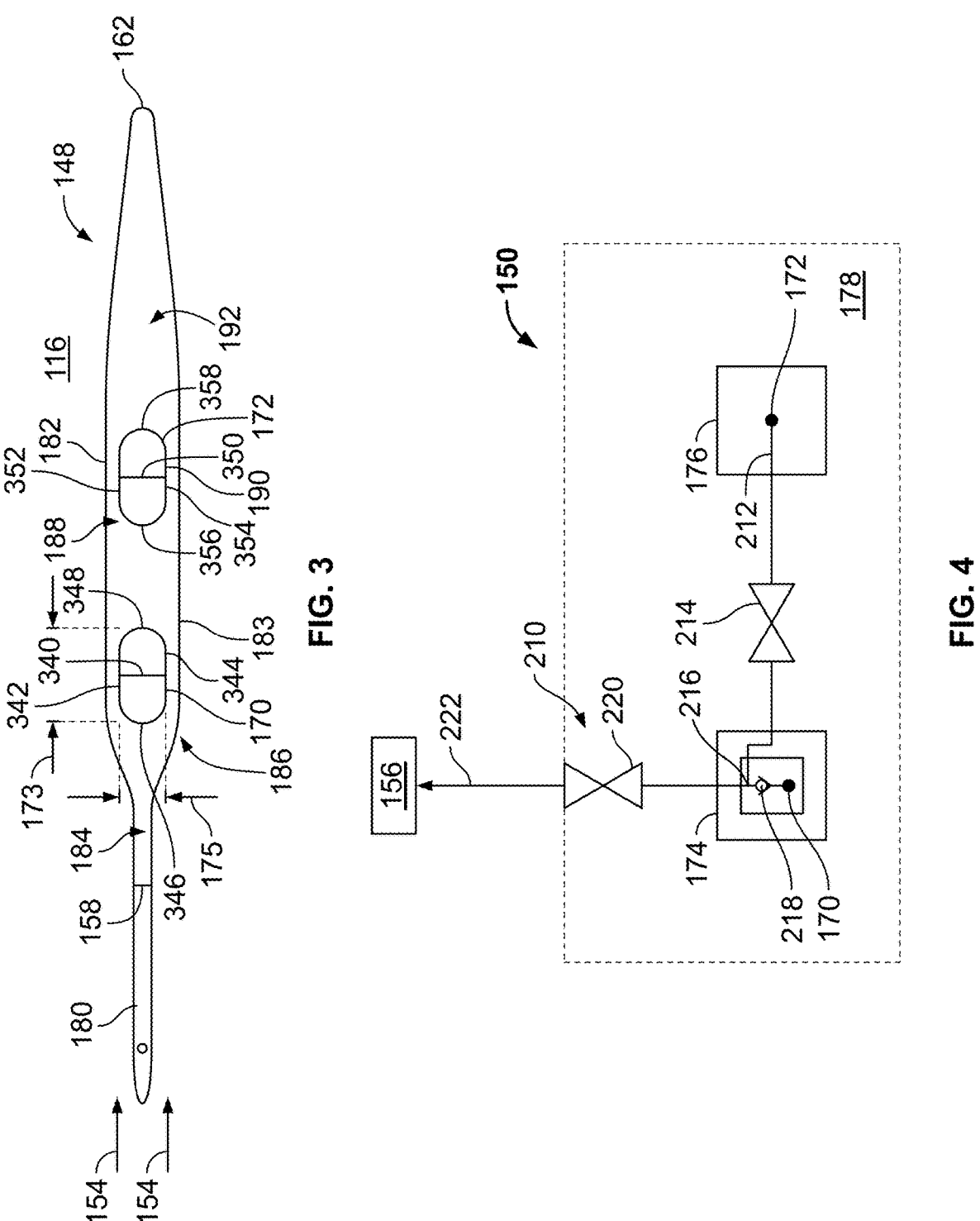
FIG. 3 is a schematic, sectional illustration taken generally through the line 3-3 in FIG. 2 showing the routing of the bleed tubes of FIG. 2 through a strut, in accordance with a number of embodiments.
FIG. 4 is a fragmentary, perspective view of certain bleed system aspects of FIG. 2, in accordance with a number of embodiments.

FIG. 3 shows the profile of the service strut 148 as seen in section and viewed in the radial inward direction. FIG. 3 omits background structure for simplicity and only shows the sectioned slice but shows the footprints of the low pressure bleed tube 170 and the high pressure bleed tube 172. The service strut 148 begins at the front frame assembly of the gas turbine engine and specifically at a strut 180 thereof. The strut 180 is a solid structural support that extends radially through the outer bypass duct 116. The leading end 158 of the service strut 148 is flat and abuts against the strut 180 and has the same lateral thickness. The bleed tubes 170, 172 have cross sectional areas optimized to maintain the desired flow area, and shaped to allow a substantial differences between the axial and lateral dimensions, which then allow the 12 O'clock strut width to be minimized. For example, with the oval shape shown, the axial dimension 173 may be approximately twice the size of the lateral dimension 175 for the low pressure bleed tube 170 and the high pressure bleed tube 172.

The service strut 148 has a pair of side walls 182, 183 that are mirror images of one another and that extend from the leading end 158 to the trailing end 162 where they join together. The side walls 182, 183 run parallel to one another for a straight section 184 of the service strut 148. The side walls 182, 183 diverge from one another downstream from the straight section 184 for a diffusion section 186, after which there is another straight section 188 where the side walls 182, 184 are again parallel to one another. The distance between the side walls 182, 184 is greater in the straight section 188 as compared to the straight section 184. This provides a space 190 adequate for necessary components to fit between the side walls 182, 184 as they are routed from or to the core 146, including the low pressure bleed tube 170 and the high pressure bleed tube 172. Downstream from the high pressure bleed tube 172 and following the straight section 188, the side walls 182, 184 converge toward one another in a converging section 192 and join together at the trailing end 162 in a smoothly curved tail. The side walls 182, 184, along with the strut 180 define an envelope 195 around the space 190. By extending radially from the core 146 to the outer wall 178, the service strut 148 provides separation of the space 190 from the air flowing 154 through the outer bypass duct 116. The low pressure bleed tube 170 and the high pressure bleed tube 172 are shown in the space 190 enveloped by the structure of the service strut 148.

Reference is directed to FIG. 4 along with FIG. 2, where at the bleed pads 174, 176 and outside the outer wall 178 of the bypass duct 116, a bleed control system 210 of the bleed system 150, including the bleed unit 168, is mounted. The bleed control system 210 will generally be concealed within the nacelle of the gas turbine engine 100 (not shown). The bleed control system 210 includes a high pressure shutoff valve (HPSOV) 214 fed from the high pressure bleed tube 172 through the bleed pad 176 and through a high pressure elbow 212. The bleed control system 210 also includes a Y-duct 216 with inlets from both the HPSOV 214 and from the low pressure bleed tube 170 through the bleed pad 174, within which the low and high pressure feed join together. A check valve 218 is provided to prevent the high pressure air from backing into the low pressure feed. A pressure regulating and shutoff valve 220 is provided downstream from the Y-duct 216 to control pressure supplied to the airframe 156 through a conduit 222.

As shown in FIG. 2, the low pressure bleed tube 170 includes an inlet flange 194 connecting with a port 196 of the compressor section 104 and an exit flange 198 connecting with an inlet of the bleed unit 168 of the bleed control system 210 at the bleed pad 174 to feed air into and through the Y-duct 216. The high pressure bleed tube 172 includes an inlet flange 200 connecting with a port 202 of the compressor section 104 and an outlet flange 204 connecting with an inlet of the bleed unit 168 of the bleed control system 210 at the bleed pad 174 to feed air through the high pressure elbow 212 and the HPSOV 214 (when open) and into and through the Y-duct 216.

Figure 5:
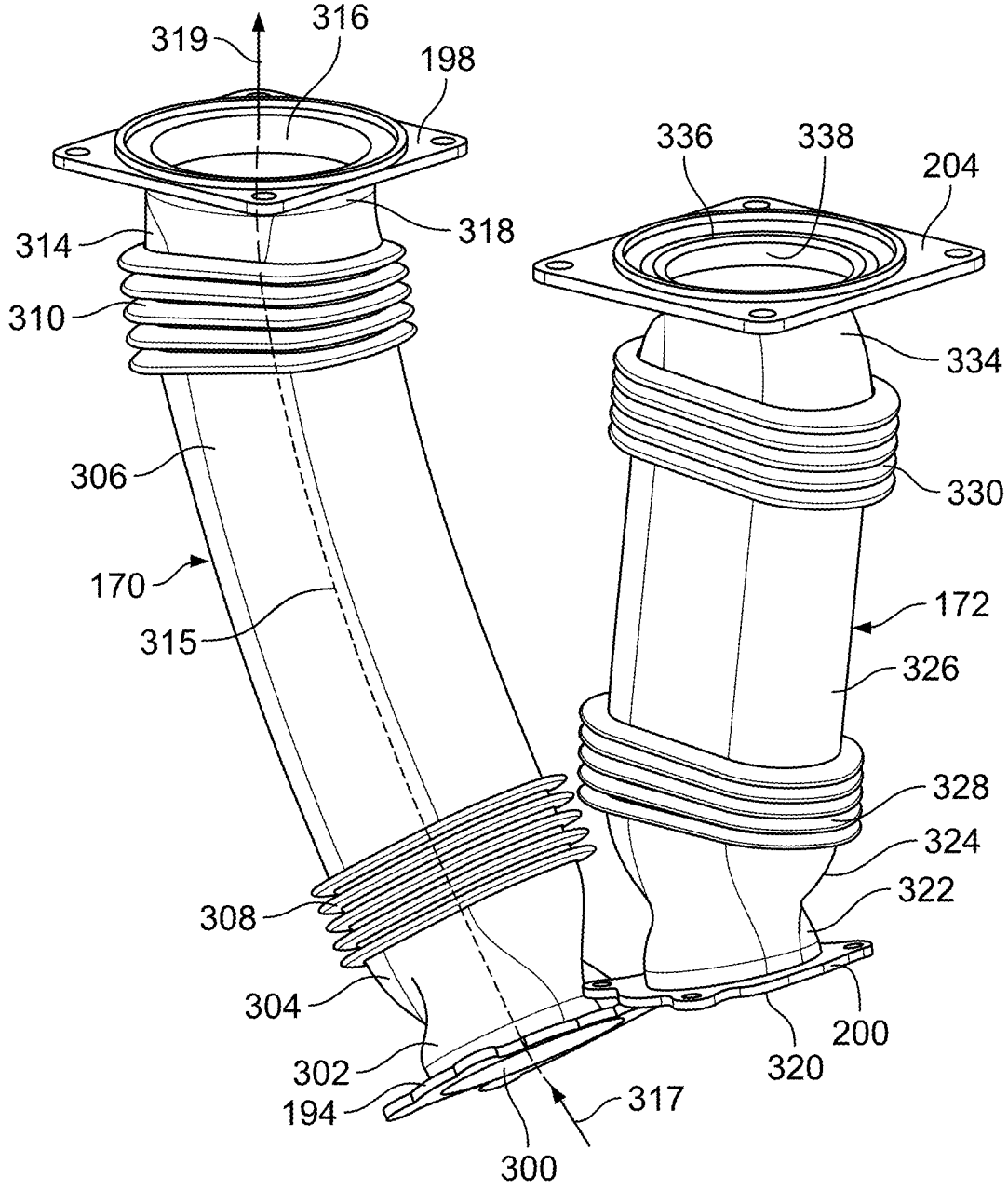
FIG. 5 is a perspective illustration of the bleed tubes of FIG. 2, in accordance with a number of embodiments.
Figure 6:
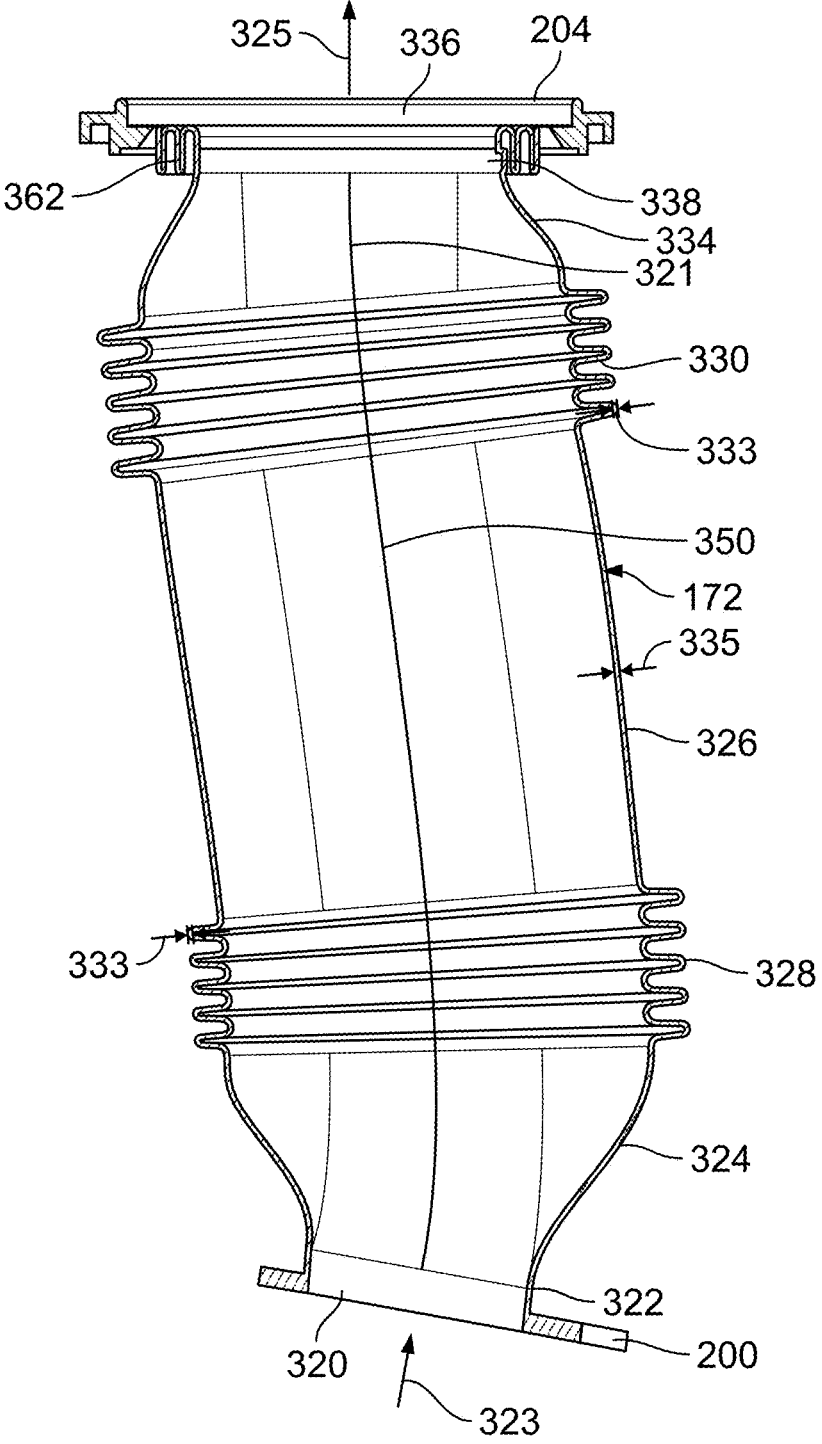
FIG. 6 is a cross sectional view of a bleed tube of the bleed system of FIG. 2, in accordance with a number of embodiments.

FIG. 5 shows both the low pressure bleed tube 170 and the high pressure bleed tube 172 and FIG. 6 shows the high pressure bleed tube 172, in each case in isolation from the remainder of the gas turbine engine 100 and extending between their respective flanges 194, 198 and 200, 204. It will be appreciated that in some embodiments, couplings other than flanges 194, 198 and 200, 204 may be employed. For example, other types of mechanical joint couplings, clamped or fixed couplers or other connections may be included.

Regarding the low pressure bleed tube 170 as shown in FIG. 5, an inlet 300 through the inlet flange 194 is round (circular) in cross section defining a cylindrical flow path section 302. The low pressure bleed tube 170 includes an inlet diffuser 304 where the round cross section transitions to an oval cross section in a central section 306. In other embodiments, rather than an oval cross section, the central section 306 may have an elliptical or another non-circular shape where the central section is narrower in one lateral direction than in another lateral direction. The specific shape may be tailored to the space (e.g. space 190), through which the low pressure bleed tube 170 is routed. Between the inlet diffuser 304 and the central section 306, the low pressure bleed tube 170 includes a bellows 308 with a number of corrugations/convolutions. At the opposite end of the central section 306 from the bellows 308, the low pressure bleed tube 170 includes another bellows 310. Both bellows 308, 310 have an oval shape the same/similar to the central section 306 with root dimensions approximately the same as (e.g. at least as large as) the open interior size of the central section 306 to not inhibit flow. Between the bellows 310 and the exit flange 198, the low pressure bleed tube 170 includes an exit diffuser 314 where the oval cross section in a central section 306 transitions to a round cross section at a cylindrical flow path section 318 and at an exit 316 through the exit flange 198.

The bellows 308 and 310 allow the low pressure bleed tube 170 to be configured into a type of an "S" shape where the exit flange 198 is disposed at a different angle relative to the inlet flange 194. In addition, because of the angular difference between the port 196 of the compressor section 104 and the bleed pad 174, the central section 306 is curved to accommodate the connections. The S-shape and the various sections of the low pressure bleed tube 170 provide for unobstructed and low-loss airflow through the low pressure bleed tube 170. S-shape herein means that the low pressure bleed tube 170 generally has a curved shape or multiply curved shape, where the curves may bend in opposite directions from one another. A spine 315 is defined as a smooth curve connecting the inlet vector 317 at the inlet 300 and an exit vector 319 at the exit 316. The geometry of the low pressure bleed tube 170 is mapped onto the spine 321 path to minimize stresses that would otherwise be induced from using straight lines connected by angled corners or small/sharp fillets.

Regarding the high pressure bleed tube 172, an inlet 320 through the inlet flange 194 is round in cross section defining a cylindrical flow path section 322. The high pressure bleed tube 172 includes an inlet diffuser 324 where the round cross section transitions to an oval cross section in a central section 326. In other embodiments, rather than an oval cross section, the central section 326 may have an elliptical or another non-circular shape where the central section is narrower in one lateral than in another lateral direction. The specific shape may be tailored to the space (e.g. space 190), through which the high pressure bleed tube 172 is routed. Between the inlet diffuser 324 and the central section 326, the high pressure bleed tube 172 includes a bellows 328 with a number of corrugations/convolutions. At the opposite end of the central section 326 from the bellows 328, the high pressure bleed tube 172 includes another bellows 330. Both bellows 328, 330 have an oval shape the same/similar to (e.g. at least as large as) the central section 326 with root dimensions approximately the same as the open interior size of the central section 326 to not inhibit flow. Between the bellows 330 and the exit flange 204, the high pressure bleed tube 172 includes an exit diffuser 334 where the oval cross section in a central section 326 transitions to a round cross section at a cylindrical flow path section 338 and at an exit 336 through the exit flange 204. The bellows 328 and 330 allow the high pressure bleed tube 172 to be configured into a type of an S-shape where the exit flange 204 is disposed at a different angle relative to the inlet flange 200. The angular difference between the port 202 of the compressor section 104 and the bleed pad 176 may be accommodated in this case with the central section 326 being a straight section. The overall S-like shape and the various sections of the high pressure bleed tube 172 provide for unobstructed and low-loss airflow through the high pressure bleed tube 172. S-shape herein means that the high pressure bleed tube 172 generally has a curved shape or multiply curved shape, where the curves may bend in opposite directions from one another. The geometry of the high pressure bleed tube 172 is mapped onto the spine 321 path between the inlet vector 323 at the inlet 320 and the outlet vector at the outlet 335 to minimize stresses that would otherwise be induced from using straight lines connected by fillets.

The pairs of bellows 308, 310 and 328, 330 accommodate relative motions between the respective coupling points of the low pressure bleed tube 170 and of the high pressure bleed tube 172. For example, movements may be accommodated during temperature, pressure and loading transients, which may be intensified by the use of different materials for different components and also during assembly. As such, the ends of each of the low pressure bleed tube 170 and of the high pressure bleed tube 172 may move relative to each other, reducing/avoiding stresses on the connected components. The bellows 308, 310, 328 and 330 are tunable to fit the application. For example, the number of convolutions included, the height/depth of the convolutions, the thickness of bellows walls, the pitch/length of bellows, etc. may be varied to achieve the desired flexibility, strength and extent of bending.

Referring again to FIG. 3, it is visible that the low pressure bleed tube 170 has a baffle 340 that is located inside the central section 306. The baffle 340 extends laterally for the entirety of the central section 306 and extends between the flat sides 342, 344 of the oval shape. The curved sides 346, 348 are located at upstream and downstream locations respectively, relative to the air flow 154. Similarly, the high pressure bleed tube 172 has a baffle 350 that is located inside the central section 326. The baffle 350 extends laterally for the entirety of the central section 326 and extends between the flat sides 352, 354 of the oval shape. The curved sides 356, 358 are located at upstream and downstream locations respectively, relative to the air flow 154. The baffle 350 is also visible in FIG. 6, which shows its length from bellows 328 to bellows 330. The baffles 340, 350 provide structure to inhibit the ducting from deforming under pressure. In addition, the baffles 340, 350 align with the desired airflow through their respective bleed tube (low pressure bleed tube 170 and high pressure bleed tube 172), which they help channel.

As shown in FIG. 6, the high pressure bleed tube 172 includes a radial bellows 362 incorporated near the exit 336 that forms the cylindrical flow path section 338, or a segment thereof. The radial bellows are disposed at approximately ninety degrees relative to the other bellows 330. The radial bellows 362 allows for significant deformations along the exit vector 325 of the spine 321 path. For example, when bolting the high pressure bleed tube 172 into the gas turbine engine 100 between the compressor section 104 and the bleed pad 176, the radial bellows 362 allows radially directed deformation for alignment. In addition, during starting operation of the gas turbine engine 100, the outer bypass duct 116 may expand radially (swell) as temperatures increase. The blowoff loads created due to thermal expansion and pressurization, which may be amplified by the use of different materials between mating parts, are accommodated by the radial bellows 362. The low pressure bleed tube 170 may or may not have a similar radial bellows as needed for the application.

Figure 7:
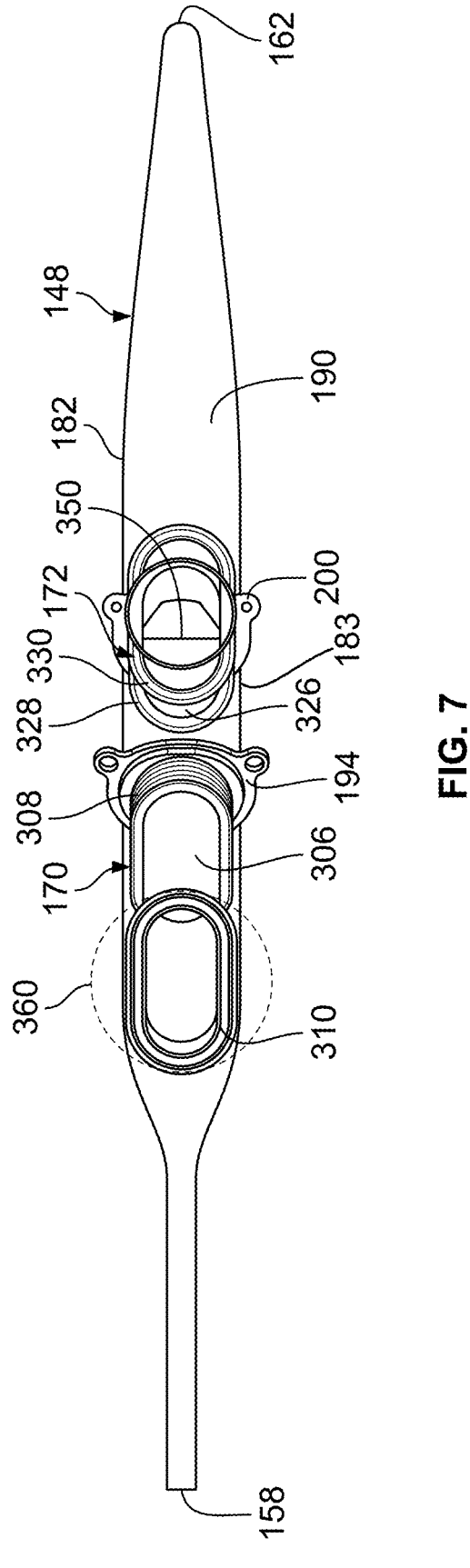
FIG. 7 is a schematic illustration of the routing of the bleed tubes of FIG. 2 through a strut, in accordance with a number of embodiments.

Referring to FIG. 7, the low pressure bleed tube 170 and high pressure bleed tube 172 in their entirety are shown relative to the cross sectional shape of the service strut 148 at the section of FIG. 3. The exit flanges 198 and 204 are omitted from the view for visibility of the other components. The bellows 308, 310, 328 and 330 and the central sections 306, 326, fit withing the space 190 of the interior of the service strut 148. The inlet flanges 194, 200 are disposed at locations radially inward from and outside the service strut 148 and outside the space 190. Using the non-circular shapes and including the bellows 308, 310, 328 and 330 enables a narrower service strut 148 than would be possible for other configurations. For example, the reference circle 360 shows the amount of width that would be required for round cross section tubes of the same internal flow area.

In the low pressure bleed tube 170 and the high pressure bleed tube 172, compressed air enters the inlets 300, 320 and moves through the diffusers 304, 324 where the cross section is changed from round/circular to the desired cross section at the bellows 308, 328 to fit the available space (e.g. space 190). The area values at the inlets 300, 320 is maintained through the entire low pressure bleed tube 170 and the high pressure bleed tube 172, respectively.

The bellows 308, 310, 328 and 330 allow for slight motion of the ducting to accommodate tolerance stacks during assembly as well as various movements during operation of the gas turbine engine 100.

The central sections 306, 326 have constant non-circular cross sections between the respective sets of bellows 308, 310 and 328, 330. The cross sectional area is optimized to maintain the desired flow characteristics, and to allow large differences between the axial and lateral dimensions, which then allows the twelve o'clock service strut's 148 width to be minimized. The same cross sectional area is maintained through the bellows 308, 310 and 328, 330.

The material thickness of each section of the low pressure bleed tube 170 and the high pressure bleed tube 172 may be varied/made different from one another. In embodiments and with reference to FIG. 6, the material (wall) thickness 333 of the bellows 328 and 330 is thinner than the wall thickness 335 of rest of the structure of the high pressure bleed tube 172, including of the central section 326. This allows the bellows 328 and 330, during assembly and operation of the gas turbine engine 100, to deform without causing permanent deformation to the high pressure bleed tube 172. The low pressure bleed tube 170 may be similarly constructed.

Baffles 340, 350 are included in the low pressure bleed tube 170 and the high pressure bleed tube 172. The baffles 340 and 350 provide structure to prevent the ducting from deforming, such as into a cylinder, from the pressures.

Accordingly, a transfer tube system is provided that couples between the compressor section of a gas turbine engine and a bleed valve unit on an outer wall of a bypass duct. The transfer tube system enables minimizing the width of a service strut through which the bleed tubes are routed to reduce noise and vibration by minimizing the occurrence of harmonic/resonance frequencies generated by fan driven air flow.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A transfer tube system for connecting between a compressor and a bleed unit of a turbomachine defined about a longitudinal axis that extends in a longitudinal direction, the transfer tube system comprising:

a valve assembly with an inlet, the valve assembly disposed to control gas flow from the compressor through a bleed system, the valve assembly disposed outside the turbomachine;

a port in fluid communication with the compressor, the port disposed in the turbomachine at the compressor;

a strut having an interior space, the strut extending in a radial direction, at least partly, between the compressor and the valve assembly, the strut extending in the longitudinal direction across the compressor and radially outside from the compressor; and a conduit connected between the port and the inlet, the conduit configured to convey gas between the compressor and the valve assembly, wherein the conduit includes a first connection coupled with the port and a second connection coupled with the inlet,

wherein the conduit is curved so that the first connection and the second connection are not in line with one another in the radial direction and are at different locations along the longitudinal direction, wherein the conduit passes through the interior space of the strut, wherein the conduit includes a first bellows disposed in the interior space of the strut and a second bellows disposed in the interior space of the strut, wherein, between the first bellows and the second bellows, the conduit has a central section with a non-circular shaped cross section in the interior space of the strut.

2. The transfer tube system of claim 1, wherein the conduit includes a radial bellows disposed adjacent to the inlet of the valve assembly and configured to adapt to movement of the central section relative to the inlet, wherein the radial bellows is disposed at about ninety degrees relative to the first bellows and is configured for radial directed deformation for movement perpendicular to a centerline of the conduit.

3. The transfer tube system of claim 1, wherein the conduit includes an internal baffle extending longitudinally in the central section, wherein the internal baffle is configured to provide structural support to the conduit, wherein the central section has an oval shape with flat sides and the internal baffle extends along the central section in its entirety and the internal baffle extends between and contacts the flat sides of the oval shape.

4. The transfer tube system of claim 1, further comprising a second conduit, wherein the second conduit extends through the interior space from a second port of the compressor to a second inlet of the valve assembly, wherein the second port is disposed at a point of the compressor that is at a different pressure as compared to the port.

5. The transfer tube system of claim 1, wherein:
the compressor is disposed in a core of the turbomachine,
a bypass duct is defined around the core;
the valve assembly is disposed on an outer wall of the bypass duct; and
the strut extends through the bypass duct from the core to the outer wall.

6. The transfer tube system of claim 1, wherein the conduit includes a cylindrical section disposed adjacent to the port, the cylindrical section having a circular cross section and including a third bellows, the third bellows disposed at about ninety degrees relative to the first bellows, the third bellows having a circular cross section, the conduit including a diffusion section that transitions the circular cross section to the non-circular cross section, wherein the diffusion section is disposed between the first bellows and the third bellows, wherein the non-circular cross section is provided at the central section and at both the first bellows and the second bellows.

7. The transfer tube system of claim 6, wherein the non-circular cross section has a flow area at least as large as the circular cross section, wherein the non-circular shaped cross section of the central section is constant in shape from the first bellows to the second bellows.

8. The transfer tube system of claim 1, wherein the central section has an axial dimension that is twice a magnitude of a lateral dimension of the central section.

9. The transfer tube system of claim 1, wherein the first bellows and the second bellows each have a first wall thickness that is thinner than a second wall thickness of the central section.

10. The transfer tube system of claim 1, wherein:
the strut extends, in the longitudinal direction, from a front frame assembly of the turbomachine,
the strut includes a leading end that is flat and abuts against an element of the front frame assembly and both the strut and the element have a lateral thickness that is the same,
the strut has a pair of side walls that are mirror images of one another and that extend from the leading end to a trailing end of the strut where the side walls join together,
the side walls are parallel to one another for a first straight section of the strut adjacent the front frame assembly,
the side walls diverge from one another downstream from the first straight section forming a diffusion section,
downstream from the diffusion section the strut includes a second straight section where the side walls are parallel to one another and where the side walls are spaced from one another defining, at least in part, the interior space,
downstream from the second straight section, the side walls converge toward one another forming a converging section,
the side walls join together at the trailing end in a curved tail,
the conduit has an oval shape at the central section with a first dimension in the longitudinal direction and a second dimension in a lateral direction perpendicular to the longitudinal direction,
the first dimension is about twice the second dimension in size so that the conduit is configured to enable minimizing a width of the strut,
the conduit has a spine configured as a smooth curve connecting an inlet vector at the port and an exit vector at the inlet, wherein the spine is substantially S-shaped, wherein the conduit is centered on the spine and the spine is disposed within the interior space in the second straight section.

11. A transfer tube system for connecting between a compressor and a bleed unit of a turbomachine defined about a longitudinal axis that extends in a longitudinal direction, the transfer tube system comprising:
a valve assembly with a first inlet and a second inlet, the valve assembly disposed to control gas flow from the compressor through a bleed system, the valve assembly disposed outside the turbomachine;
a first port in fluid communication with the compressor, the first port disposed in the turbomachine at the compressor;
a second port in fluid communication with the compressor, the second port disposed in the turbomachine at the compressor;
a strut having an interior space, the strut extending in a radial direction, at least partly, between the compressor and the valve assembly, the strut extending in the longitudinal direction across the compressor and radially outside from the compressor;
a first conduit configured as a first bleed tube connected between the first port and the first inlet, the first conduit configured to convey a first gas flow between the compressor and the valve assembly; and
a second conduit configured as a second bleed tube connected between the second port and the second inlet, the second conduit configured to convey a second gas flow between the compressor and the valve assembly,
wherein both the first conduit and the second conduit extend through the interior space of the strut, wherein the first conduit includes a first pair of bellows disposed in the interior space of the strut and the second conduit includes a second pair of bellows disposed in the interior space of the strut, wherein the first conduit includes a first connection coupled with the first port and a second connection coupled with the first inlet, wherein the second conduit includes a third connection coupled with the second port and a fourth connection coupled with the second inlet, wherein each of the first conduit and the second conduit is curved and each extends from a respective inlet flange at the compressor to a respective exit flange at the valve assembly, each respective exit flange disposed at a different angle as compared to its respective inlet flange, wherein, between the first pair of bellows, the first conduit has a first central section with a first non-circular shaped cross section in the interior space of the strut, wherein, between the second pair of bellows, the second conduit has a second central section with a second non-circular shaped cross section in the interior space of the strut.

12. The transfer tube system of claim 11, wherein the first conduit includes a radial bellows disposed adjacent to the first inlet and configured to adapt to movement of the first central section relative to the first inlet, wherein the radial bellows is disposed at about ninety degrees relative to the first bellows and is configured for radial directed deformation for movement perpendicular to a centerline of the first conduit.

13. The transfer tube system of claim 11, wherein the first conduit includes a first internal baffle extending longitudinally in the first central section, the first internal baffle configured to provide structural support to the first conduit, and wherein the second conduit includes a second internal baffle extending longitudinally in the second central section, the second internal baffle configured to provide structural support to the second conduit, wherein the first central section has an oval shape with flat sides and the first internal baffle extends along the first central section in its entirety and the first internal baffle extends between and contacts the flat sides of the oval shape.

14. The transfer tube system of claim 11, wherein the second port is disposed at a point of the compressor that is at a lower pressure as compared to the first port.

15. The transfer tube system of claim 11, wherein:
the compressor is disposed in a core of the turbomachine,
a bypass duct is defined around the core;
the valve assembly is disposed on an outer wall of the bypass duct and comprises the bleed unit with a high pressure shutoff valve, and a pressure regulating valve; and
the strut extends through the bypass duct from the core to the outer wall.

16. The transfer tube system of claim 11, wherein the first conduit includes a cylindrical section disposed adjacent to the first port, the cylindrical section having a circular cross section and including a third bellows, the third bellows disposed at about ninety degrees relative to the first bellows, the third bellows having a circular cross section, wherein the first conduit includes a diffusion section that transitions the circular cross section to the first non-circular shaped cross section, wherein the diffusion section is disposed between the first bellows and the third bellows, wherein the first non-circular shaped cross section is provided at the first central section and at each bellows in the first pair of bellows.

17. The transfer tube system of claim 16, wherein the first non-circular shaped cross section has a flow area at least as large as the circular cross section, wherein the first non-circular shaped cross section of the central section is constant in shape from the first bellows to the second bellows.

18. The transfer tube system of claim 11, wherein the first central section has an axial dimension that is twice a magnitude of a lateral dimension of the first central section.

19. The transfer tube system of claim 11, wherein:
the strut extends, in the longitudinal direction, from a front frame assembly of the turbomachine,
the strut includes a leading end that is flat and abuts against an element of the front frame assembly and both the strut and the element have a lateral thickness that is the same,
the strut has a pair of side walls that are mirror images of one another and that extend from the leading end to a trailing end of the strut where the side walls join together,
the side walls are parallel to one another for a first straight section of the strut adjacent the front frame assembly,
the side walls diverge from one another downstream from the first straight section forming a diffusion section,
downstream from the diffusion section the strut includes a second straight section where the side walls are parallel to one another and where the side walls are spaced from one another defining, at least in part, the interior space,
downstream from the second straight section, the side walls converge toward one another forming a converging section,
the side walls join together at the trailing end in a curved tail,
the first conduit has an oval shape at the central section with a first dimension in the longitudinal direction and a second dimension in a lateral direction perpendicular to the longitudinal direction,
the first dimension is about twice the second dimension in size so that the first conduit is configured to enable minimizing a width of the strut,
the first conduit has a spine configured as a smooth curve connecting an inlet vector at the first port and an exit vector at the first inlet, wherein the spine is substantially S-shaped, wherein the first conduit is centered on the spine and the spine is disposed within the interior space in the second straight section.

20. A transfer tube system for connecting between a compressor and a bleed unit of a turbomachine defined about a longitudinal axis that extends in a longitudinal direction, the transfer tube system comprising:
a valve assembly in the bleed unit that has a first inlet and a second inlet, the valve assembly disposed to control bleed air flow from the compressor through a bleed system, the valve assembly disposed outside the turbomachine;
a first port in fluid communication with the compressor and configured to receive a first pressure, the first port disposed in the turbomachine at the compressor;
a second port in fluid communication with the compressor and configured to receive a second pressure, wherein the second pressure is different than the first pressure, the second port disposed in the turbomachine at the compressor;

a strut having an interior space, the strut extending in a radial direction, at least partly, between the compressor and the valve assembly and through a bypass duct of the turbomachine, the strut extending in the longitudinal direction across the compressor and radially outside from the compressor;

a first conduit configured as a first bleed tube connected between the first port and the first inlet, the first conduit configured to convey a first flow of bleed air between the compressor and the valve assembly; and a second conduit configured as a second bleed tube connected between the second port and the second inlet, the second conduit configured to convey a second flow of bleed air between the compressor and the valve assembly, wherein both the first conduit and the second conduit extend through the interior space of the strut, wherein the first conduit includes a first connection coupled with the first port and a second connection coupled with the first inlet, wherein the second conduit includes a third connection coupled with the second port and a fourth connection coupled with the second inlet, wherein the first conduit includes a first pair of bellows disposed in the interior space of the strut and the second conduit includes a second pair of bellows disposed in the interior space of the strut, wherein, between the first pair of bellows, the first conduit has a first central section with a first non-circular shaped cross section in the interior space of the strut, wherein, between the second pair of bellows, the second conduit has a second central section with a second non-circular shaped cross section in the interior space of the strut, wherein each of the first conduit and the second conduit is curved and each extends from a respective inlet flange at the compressor to a respective exit flange at the valve assembly, each respective exit flange disposed at a different angle as compared to its respective inlet flange, wherein the first conduit has a spine comprising a smooth curve connecting an inlet vector at the first port and an exit vector at the first inlet, wherein the spine is substantially S-shaped.

* * * * *